April 29, 1958     F. L. COUPE     2,832,602
VACUUM CHUCK FOR GLASS ARTICLES
Filed Oct. 20, 1955     2 Sheets-Sheet 1

INVENTOR.
Fred L. Coupe
BY W. A. Schaich
L. D. Soubier
ATTORNEYS

April 29, 1958     F. L. COUPE     2,832,602
VACUUM CHUCK FOR GLASS ARTICLES
Filed Oct. 20, 1955     2 Sheets-Sheet 2
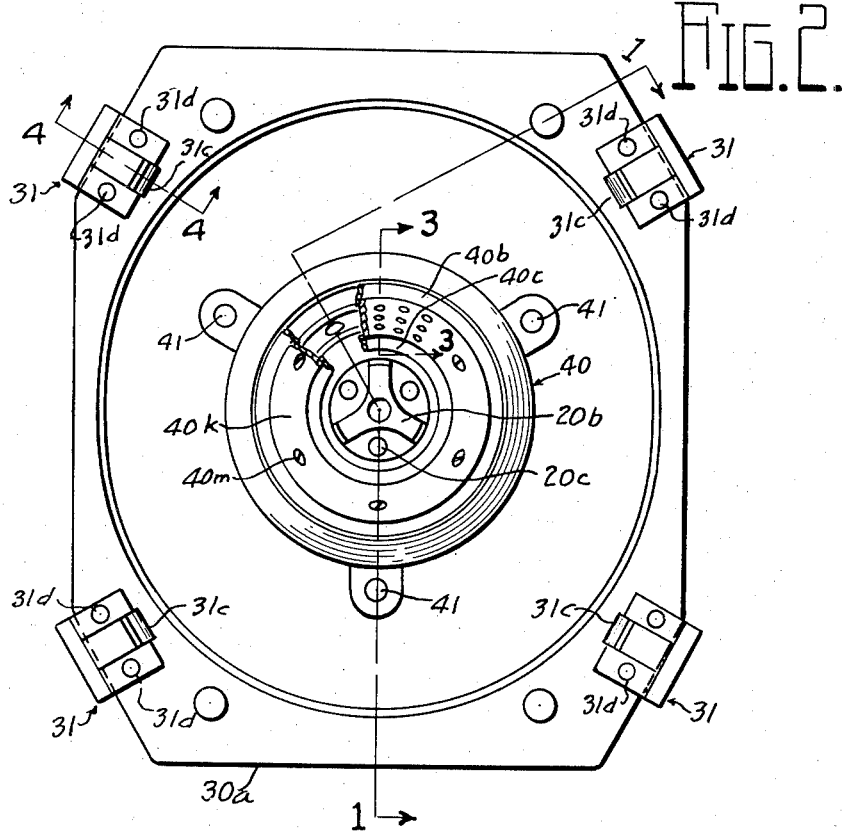
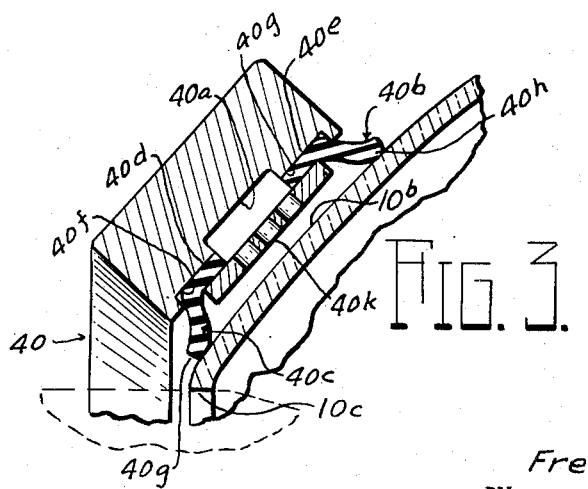
INVENTOR.
Fred L. Coupe
BY W. A. Schaich
L. D. Soubier
ATTORNEYS

United States Patent Office 2,832,602
Patented Apr. 29, 1958

2,832,602
VACUUM CHUCK FOR GLASS ARTICLES

Fred L. Coupe, Toledo, Ohio, assignor to Owens-Illinois Glass Company, a corporation of Ohio Application October 20, 1955, Serial No. 541,651

4 Claims. (Cl. 279—3)

This invention relates to an apparatus for supporting and positioning funnel-shaped glass articles, such as the funnel portion of a cathode-ray tube, so that manufacturing operations can be performed thereon with a high degree of precision.

Originally, all glass cathode-ray tubes for television purposes embodied a face plate portion, a funnel portion and a cylindrical neck portion which was integrally formed on the reduced diameter end of the funnel portion. Such cylindrical neck portion provided a very convenient means for supporting the funnel during subsequent manufacturing operations. However, there has been an increasing demand for rectangular cathode-ray tubes of shorter axial length, which has resulted in the formation of a tube permitting beam deflection angles ranging up to 120°. However, this tube design results in a non-concentric funnel shape and practically prohibits the integral formation of a cylindrical neck portion on such funnel so that the supporting and positioning of the neckless funnel for subsequent manufacturing operations has presented a difficult problem, due to the odd shape and bulkiness of the glass funnels.

Accordingly, it is an object of this invention to provide an improved apparatus for accurately positioning a funnel-shaped glass article so that manufacturing operations may be performed thereon.

Still another object of this invention is to provide an improved vacuum operated chuck construction for supporting a neckless funnel portion of a glass cathode-ray tube.

The specific nature of this invention, as well as other objects and advantages thereof, will become apparent to those skilled in the art from the following detailed description taken in conjunction with the annexed sheet of drawings, on which, by way of preferred example only, is illustrated an embodiment of this invention.

On the drawings:

Fig. 2 is an end elevational view of the chuck of Fig. 1;

Fig. 3 is an enlarged scale sectional view taken on the plane 3—3 of Fig. 2;

Figure 1:
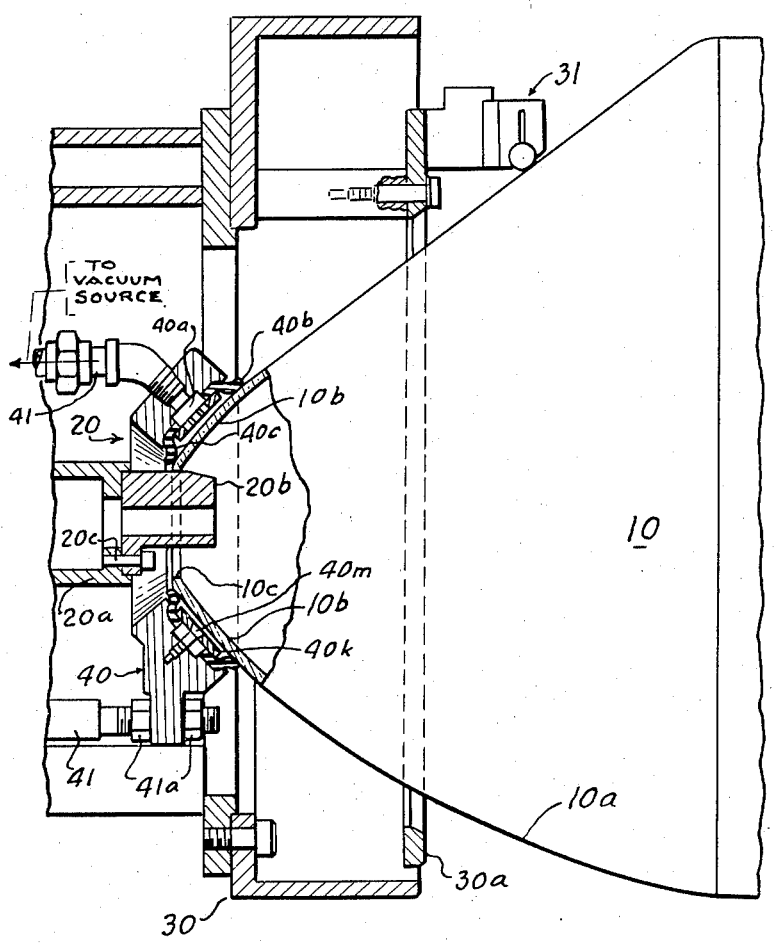
Fig. 1 is a vertical sectional view of a chuck embodying this invention, showing a cathode-ray tube funnel mounted therein.
Figure 4:
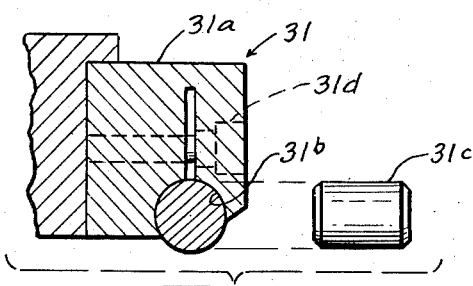
Fig. 4 is an enlarged scale sectional view taken on the plane 4—4 of Fig. 2.

This invention is particularly applicable to the supporting and positioning of non-symmetrical funnel-shaped glass articles, such as the neckless funnel 10 of a rectangularly faced cathode-ray tube. While the side wall portions 10a of such cathode-ray tube funnel 10 are generally not symmetrically formed throughout their entire area, such side walls are commonly provided with an approximately symmetrical frusto-conical portion 10b immediately adjacent the small diameter end 10c of the funnel. In accordance with this invention, a chuck unit 20 is provided for supporting and positioning the glass funnel 10 so that further manufacturing operations may be performed thereon. While not limited thereto, the chuck 20 may form part of the rotating head stock (not shown) of a glass working lathe. In any event, the chuck unit 20 includes a central hub portion 20a, on the end of which a graphite support 20b is secured by bolts 20c. Support 20b is proportioned to be freely insertable within the small diameter end 10c of the glass funnel 10 and to provide gravitational support for the end of such funnel.

An annular guide frame structure 30 is provided in surrounding relationship to the hub element 20a and supports a guide ring 30a in concentric, axially spaced relationship with respect to the hub element 20a. At spaced intervals around guide ring 30a, a plurality of locating stops 31 are provided. Each stop includes a base clamp portion 31a defining a split clamp recess 31b for receiving a cylindrical graphite locating projection 31c. Screws 31d effect the clamping of the graphite projections 31c in the clamping recesses 31b. The locating projections 31c are thus positioned to engage a medial portion of the tapered external surface of the glass funnel 10 when a particular funnel has its small end inserted through the guide ring 30a and mounted upon the graphite hub support element 20b.

Additionally, an annular housing 40 is provided in surrounding relationship to the hub 20a, being supported on a plurality of threaded posts 41 and being axially adjustable relative to such posts by a pair of cooperating nuts 41a. The housing 40 defines an annular recess 40a which surrounds the graphite hub element 20b and has an open face substantially parallel to the frusto-conical portion 10b of the supported glass funnel 10. A pair of flexible gasket rings 40b and 40c are respectively mounted on housing 40 on opposite sides of the annular recess 40a. The gasket rings have a generally angular cross-sectional configuration and respectively include base portions 40d and 40e, which are respectively seatable in annular channels 40f and 40g provided on opposite sides of the recess 40a. Additionally, the gaskets 40b and 40c include angularly projecting flange portions 40g and 40h, which respectively engage the adjacent frusto-conical surface 10b of a supported glass funnel in sealing relationship. Gaskets 40b and 40c are retained in position by a perforated ring 40k which is secured to housing 40 by a plurality of screws 40m.

A pipe 41 is provided which communicates between recess 40a and a suitable source of subatmospheric pressure. Accordingly, the pressure existing within the recess 40a, and hence within the space defined between the gasket rings 40c and 40d and the frusto-conical surface 10b of the glass funnel, may be reduced below atmospheric pressure, with the result that the glass funnel 10 tends to be drawn toward the annular housing 40a to the extent permitted by the locating projections 31c.

From the foregoing description, it is clearly apparent that the described apparatus will securely and accurately position successive glass funnels in substantially identical spatial relationship so that further manufacturing operations can be accurately and expeditiously performed on such funnels. Each glass funnel 10 is manually inserted within the apparatus by sliding the small diameter end of the funnel onto the graphite hub element 20b and then applying vacuum to the recessed housing 40. Release of such vacuum permits the funnel to be manually withdrawn from the supporting apparatus.

It will, of course, be understood that various details of construction may be modified through a wide range without departing from the principles of this invention, and it is not the purpose therefore to limit the patent granted hereon otherwise than necessitated by the scope of the appended claims.

I claim:
1. Apparatus for positioning funnel-shaped glass articles comprising a hub element adapted for insertion through the small end of said funnel-shaped article and engageable with the rim of said small end to support same, a locating projection having a fixed spatial relationship with respect to said hub element and adapted to contact a medial portion of the conical exterior surface of said article when said article is supported by said hub element, an annular housing surrounding said hub element, said housing defining an annular recess having an annular opening surrounding but spaced from the conical exterior surface of a supported glass article, a pair of flexible gasket rings respectively mounted on said housing on opposite sides of said annular opening and sealingly engageable with an annular portion of the adjacent conical wall area of the supported glass article, and means for producing subatomspheric pressure in said recess, whereby a supported glass article is firmly positioned against said locating projection.

2. The combination defined in claim 1 wherein each of said gasket rings is of angular cross-section defining a base ring portion abutting said housing and an integral projecting flange portion engageable with the supported glass article, a perforated retaining ring overlying both of said base ring portions, and means for securing said retaining ring to said annular housing to clamp said gasket rings therebetween.

3. Apparatus for positioning funnel-shaped glass articles comprising a hub element adapted for insertion through the small end of the said funnel-shaped article and engageable with the rim of said small end to support same, an annular housing surrounding said hub element, said housing defining an annular recess having an annular opening surrounding but spaced from the conical exterior surface of a supported glass article, a pair of flexible gasket rings respectively mounted on said housing on opposite sides of said annular opening and sealingly engageable with an annular portion of the adjacent conical wall area of the supported glass article, and means for producing subatmospheric pressure in said recess, thereby positioning the supported glass article.

4. The combination defined in claim 3 wherein each of said gasket rings is of angular cross-section defining a base ring portion abutting said housing and an integral projecting flange portion engageable with the supported glass article, a perforated retaining ring overlying both of said base ring portions, and means for securing said retaining ring to said annular housing to clamp said gasket rings therebetween.

References Cited in the file of this patent
UNITED STATES PATENTS

| | | |
|---|---|---|
| 963,060 | Noppel | July 5, 1910 |
| 1,739,641 | Lessmann | Dec. 17, 1929 |
| 2,127,181 | Mattern | Aug. 16, 1938 |